US007490841B2

(12) United States Patent
Castello et al.

(10) Patent No.: US 7,490,841 B2
(45) Date of Patent: Feb. 17, 2009

(54) PASSENGER DETECTION SYSTEM

(75) Inventors: Timothy J. Castello, West Chester, PA (US); Phillip J. Tkacik, Elmira, NY (US)

(73) Assignee: Miller Edge, Inc., West Grove, PA (US)

( * ) Notice: Subject to any disclaimer, the term of this patent is extended or adjusted under 35 U.S.C. 154(b) by 0 days.

(21) Appl. No.: 11/669,491

(22) Filed: Jan. 31, 2007

(65) Prior Publication Data

US 2007/0182550 A1 Aug. 9, 2007

Related U.S. Application Data

(60) Provisional application No. 60/763,585, filed on Jan. 31, 2006.

(51) Int. Cl.
*B60K 28/10* (2006.01)

(52) U.S. Cl. ...................................................... 280/274

(58) Field of Classification Search ................. 180/271, 180/274, 287; 280/735; 340/540, 541, 545.2, 340/545.3

See application file for complete search history.

(56) References Cited

U.S. PATENT DOCUMENTS 4,823,010 A * 4/1989 Kornbrekke et al. ..... 250/341.7
6,075,603 A 6/2000 O'Meara et al.
6,087,652 A 7/2000 O'Meara et al.
6,782,660 B2 * 8/2004 Takada et al. .................. 49/25
6,791,461 B2 * 9/2004 Oku et al. ................ 340/573.1
6,812,837 B2 * 11/2004 Ikeuchi .................... 340/545.1
6,919,804 B1 7/2005 Cook et al.

OTHER PUBLICATIONS

How Infrared Motion Detector Components Work, http://www.glolab.com, Jan. 2006, pp. 1-5.
Innovations at Work, http://archives.masstransitmag.com, Jul. 18, 2005, pp. 1-7.
CLASS Contact-Less Acoustic Sensing System, www.vapordoors.com, Bulletin No. 53-3099, Sep. 2004, pp. 1-4.
Products>Pedestrian Products>Safety, www.beainc.com, May 26, 2002, 1 page.

* cited by examiner

*Primary Examiner*—Faye M. Fleming
(74) *Attorney, Agent, or Firm*—Panitch Schwarze Belisario & Nadel LLP

(57) ABSTRACT

A passenger detection system is provided for a vehicle Which includes at least one opening to allow passengers to enter and exit the vehicle and a door positioned within the at least one opening. The door has a closed position and an open position. A first infrared sensor is located proximate to the door. The first infrared sensor has a first sensing area for detecting whether a passenger is within the first sensing area. The first sensing area is within the vehicle proximate to the door. A second infrared sensor is located proximate to the door. The second infrared sensor has a second sensing area for detecting whether a passenger is within the second sensing area. The second sensing area is within the vehicle when the door is closed and is outside of the vehicle proximate to the door when the door is open.

14 Claims, 4 Drawing Sheets

PASSENGER DETECTION SYSTEM

CROSS-REFERENCE TO RELATED APPLICATIONS

This application claims the benefit of U.S. Provisional Patent Application No. 60/763,585 filed Jan. 31, 2006 entitled "Passenger Detection System for Transit Vehicle Exit Door" which is incorporated by reference herein in its entirety.

BACKGROUND OF THE INVENTION

The present invention relates generally to a system for the detection of the presence of a passenger exiting a transit vehicle and, more particularly, to such a system which detects when a passenger wishes to exit the transit vehicle through a remotely located exit door and when the passenger has cleared the exit door so the door may be safely closed.

Remotely actuated exit doors are well known in transit vehicles. Such doors typically function to permit passengers to exit from the transit vehicle when the transit vehicle reaches a designated transit stop. Typically, once the transit vehicle has safely stopped, the driver or operator actuates a control to "enable" the rear exit doors to be opened by a passenger wishing to exit the transit vehicle. In some such transit vehicles, the passenger must physically touch a handle or other portion of one of the rear exit doors, giving it a small push to thereby open the exit doors. In other transit vehicles, a passenger wishing to exit need only press an exit button or otherwise actuate a sensor associated with the doors to automatically open the doors to permit the passenger to exit the vehicle.

Over the years, many systems have been developed for detecting the presence of an exiting passenger passing through an exit doorway, particularly an exit doorway located remotely from the driver or operator of the vehicle. Such systems include mechanical sensing devices, ultrasonic sensing devices, and the like.

While some such prior art systems function reasonably well, there is a need for an improved passenger detection system which is less expensive to install, operate and maintain, yet which is highly effective in detecting the presence of passengers exiting the transit vehicle through a remotely located exit door to prevent the door from closing too soon.

BRIEF SUMMARY OF THE INVENTION

Briefly stated, the present invention is directed to a passenger detection system for a vehicle. The passenger detection system includes at least one opening to allow passengers to enter and exit the vehicle and a door positioned within the at least one opening. The door has a closed position and an open position. A first infrared sensor is located proximate to the door. The first infrared sensor has a first sensing area for detecting whether a passenger is within the first sensing area. The first sensing area is within the vehicle proximate to the door. A second infrared sensor is located proximate to the door. The second infrared sensor has a second sensing area for detecting whether a passenger is within the second sensing area. The second sensing area is within the vehicle when the door is closed and is outside of the vehicle proximate to the door when the door is open.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

DETAILED DESCRIPTION OF THE INVENTION

Figure 1:
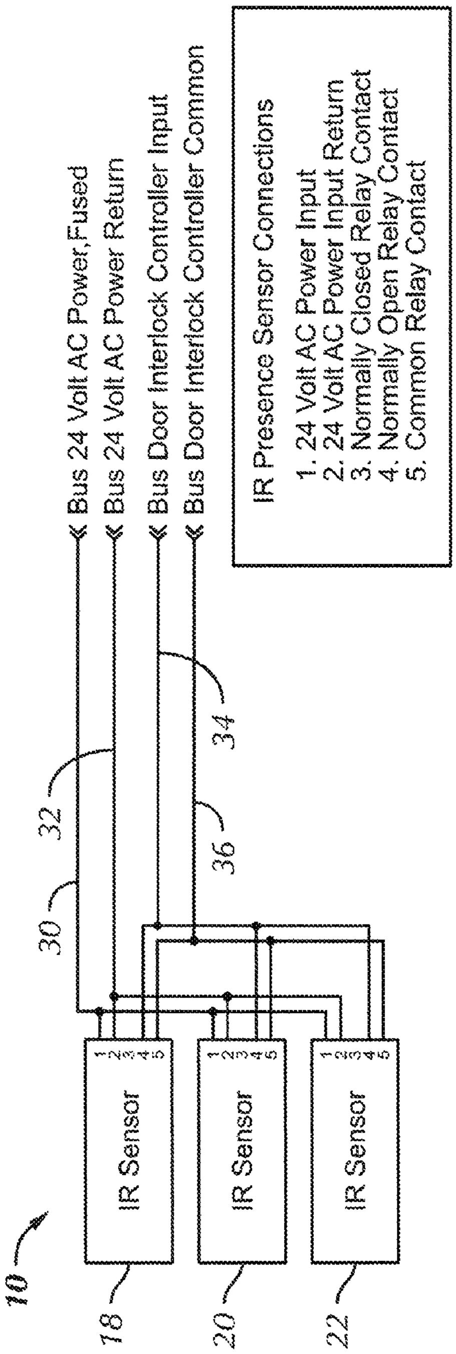
FIG. 1 is a schematic representation of three infrared sensors forming a first preferred embodiment of a passenger detection system in accordance with the present invention.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of a passenger detection system in accordance with the present invention, and designated parts thereof. The terminology includes the words noted above, derivatives thereof and words of similar import.

Referring to the drawings, wherein the same reference numerals are used to represent the same components throughout, they are shown in FIGS. 1-5 a schematic representation of a passenger detection system, generally 10. The passenger detection system 10 operates in conjunction with a door or doorway 12 that is preferably located in the rear or remotely located within the exit doorway of a transit bus 13. While the door 12 of the bus 13 is utilized herein for the purposes of illustrating the present invention, it should be clearly understood that the present invention is not limited to use with a vehicle such as a transit bus 13. Instead, the present invention may be used with virtually with any other type of transit or other vehicle, either rubber wheeled or steel wheeled, including transit vehicles such as magnetic levitation vehicles, cable cares or other suspended vehicles. Thus, the present invention is equally applicable to a subway vehicle or other trains a tram, or virtually any other type of transit vehicle. Similarly, although the embodiment described below relate to a remotely actuated exit doorway 12 located at the rear of a bus, the present invention is equally applicable to virtually any other type of controlled doorway and virtually any other location of a vehicle.

Figure 3A:
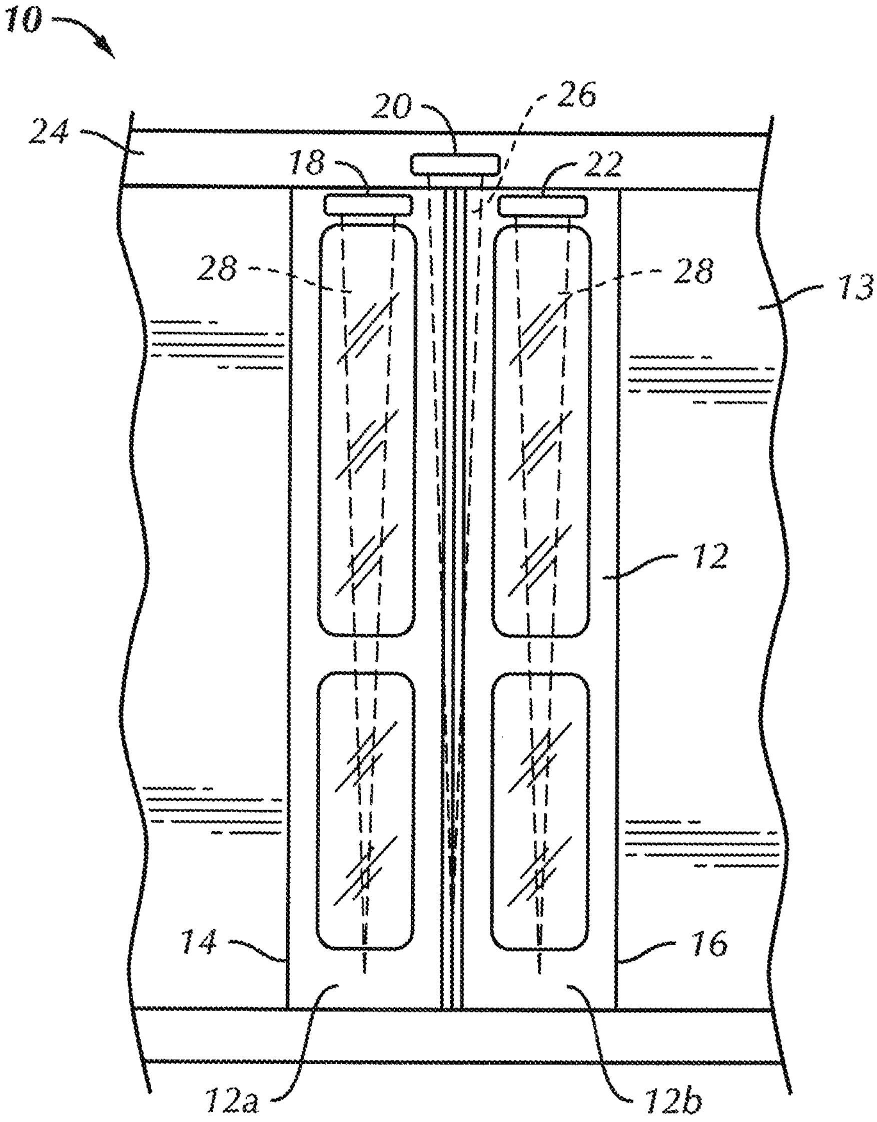
FIG. 3A is a schematic elevational representation of a rear exit door of a transit bus interior illustrating the location and operation of the three infrared sensors shown in FIG. I with the exit door in a closed condition.
Figure 3B:
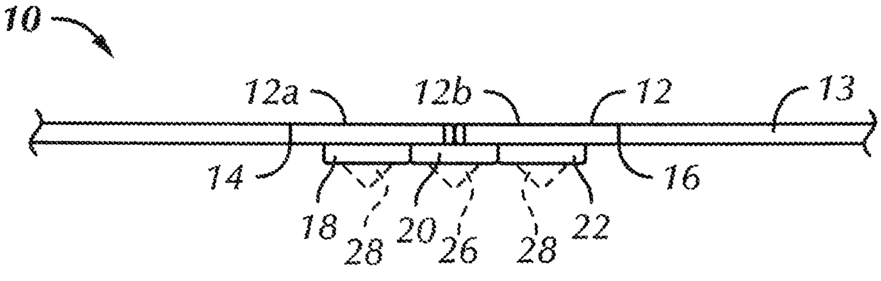
FIG. 3B is a schematic top plan view of the door of FIG. 3A.
Figure 4A:
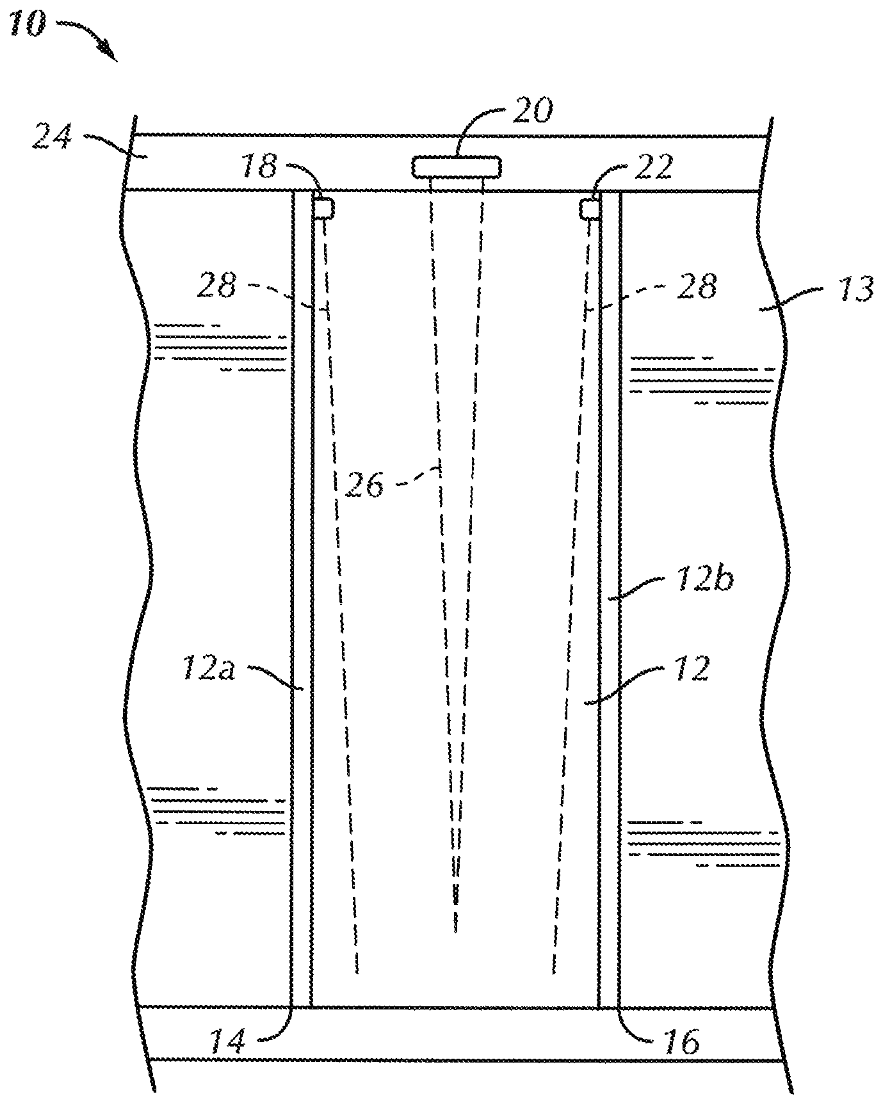
FIG. 4A is a schematic elevational view similar to FIG. 3A showing the door in an open condition.
Figure 4B:
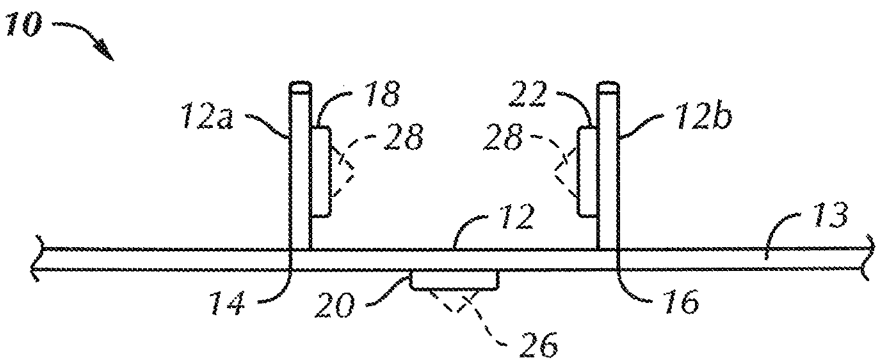
FIG. 4B is a schematic top plan view similar to FIG. 3B showing the door in an open condition.
Figure 5:
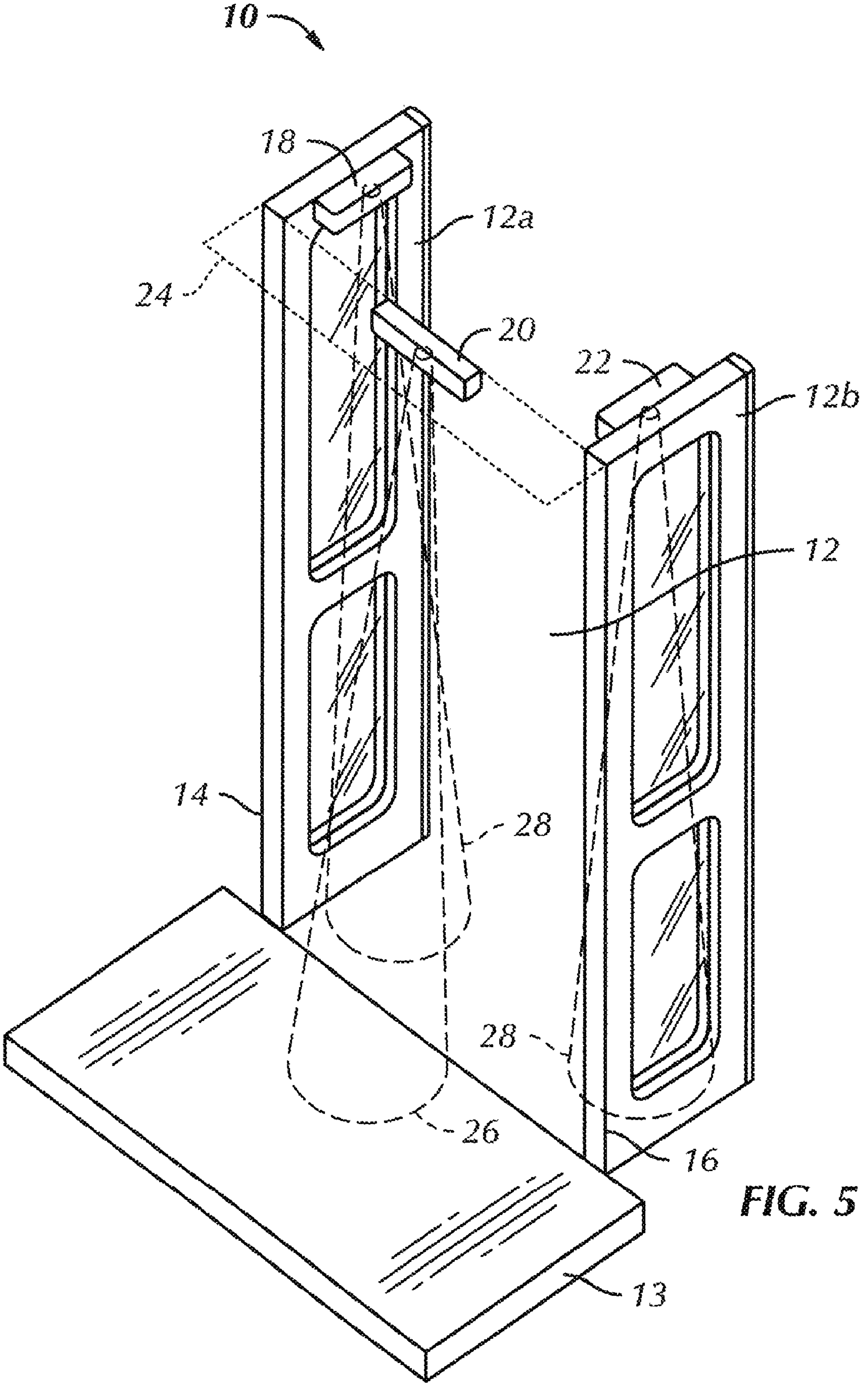
FIG. 5 is a schematic perspective view of the door of FIG. 4A.

As shown in FIGS. 3-5, the door 12 includes a first door panel 12*a* and a second door panel 12*b*. FIGS. 3A and 3B show the door 12 in a closed position while FIGS. 4A*a*, 4B and 5 show the door 12 in an open position. The door 12 has a typical configuration of many transit bus rear exit doors and opens outwardly by pivoting about axes 14, 16 or a bar linkage (not shown) located at the left or right side respectively of the door panels 12*a*, 12*b* of the door 12 to permit a passenger to exit from the bus. It is preferred that the door 12 has a central opening and outwardly pivoting panels 12*a*, 12*b* such that the panels 12*a*, 12*b* are perpendicular in the open position as compared to the closed position. The door panels 12*a*, 12*b* are not limited to this opening configuration, and may include any opening configuration known in the art.

The passenger detection system 10 allows the door 12 to open once the bus 13 is stopped and the driver or operator has enabled the door 12 to determine whether a passenger is present near the closed doorway 12. The passenger detection system 10 also prevents the doors from closing if a passenger is within the open doorway 12 or between the open door panels 12*a*, 12*b* in order to prevent the door 12 from closing until such time as the passenger has completely exited the transit bus and is clear of both the door panels 12*a*, 12*b*.

The passenger detection system 10, in the preferred embodiment is comprised of three individual infrared sensors 18, 20, 22. The infrared sensors 18, 20, 22 are all preferably of a type of active infrared detecting sensors which are generally available from a variety of manufacturers known to those of ordinary skill in the art. Preferably, each of the infrared sensors 18 20. 22 are active sensors which include a transmitter and a receiver (not shown). The transmitter em-its a precise beam of infrared which measures 10.16 centimeters (4 inches) in diameter at a distance of 2.44 meters (8 feet). The transmission and reception forms a first and second sensing areas 26, 28, called triangulation and schematically represented in FIGS. 3A and 4A. The first and second sensing areas 26, 28 are adjustable to a length equal to or less than the length of the doorway 12. Should the sensing areas 26, 28 be interrupted, detection occurs.

Additionally, the sensors 18, 20, 22 may be include passive infrared sensors including a detection range which is adjustable between about one-half and two and one-half meters with a sensing area of approximately 0.1 meter in diameter to a distance of 1.7 meters. Preferably, the infrared sensors 18, 20, 22 sense a presence or a change in infrared within the sensing areas with a response time in the range of less than 15 milliseconds. The passive infrared sensors include at least two sensing elements connected in a voltage bucking configuration (not shown). Such an arrangement cancels signals caused by vibration, temperature, and changes in sunlight. An object such as a passenger passing in front of the sensor will activate the first sensing element and then subsequently activate the second sensing element whereas outside or other sources will affect both elements simultaneously and be cancelled.

The infrared sensors 18, 20, 22 are preferably capable of withstanding the shock and vibration experienced by the transit vehicle or bus 13 and are able to function properly within the extreme temperature range to which the transit bus 13 may be exposed. The infrared sensors 18, 20, 22 are resistant to environmental conditions to which they may be exposed, such as rain, snow, high winds, sunlight, common vandalism and are sealed to be resistant to moisture penetration and include a radio frequency interference (RFI) protection. The infrared sensors 18, 20, 22 may be powered by the electrical system of the bus 13. In the case of the present embodiment, the infrared sensors 18, 20, 22 are operated using the 24-volt AC power available from the electrical system of the bus 13.

As best shown in FIGS. 3A, 4A, and 5 the first or center infrared sensor 20 is located on or within a header 24 above the door 12. The additional infrared sensors 18, 22 also referred to as the second infrared sensors 18, 22 are located proximate the top inside surface of each of the respective door panels 12*a*, 12*b*. As shown in FIGS. 3A, 4A and 5 each of the first and second infrared sensors 18, 20. 22 respectively capture or establish the downwardly extending first and second sensing,-areas 26, 28 as schematically illustrated. It is within the spirit and scope of the invention that the first and second sensing areas 26, 28 are not limited to a conical or triangular shape as shown and may include any shape and area depending on the Ions and type of sensor used within the first and second infrared sensors 18, 20, 22.

An object, an infrared emitting object if passive sensors are utilized, must pass across the infrared sensor 18, 20, 22 in a horizontal or in a direction generally perpendicular to the orientation of the sensing elements so that the elements are sequentially exposed to the infrared source or intercept the triangulated infrared beam. Preferably, the length and size of each of the first and second sensing areas 26, 28 is adjustable to compensate in the differences in the distances between the location of the infrared sensors 18, 20, 22 and the floor and/or steps and other features of the bus and to vary or extend the area of coverage of the first and second sensors 18, 20, 22. Likewise, the angle of the first and second sensing areas 26, 28 may be adjusted to vary the area of coverage of the first and second sensors 18, 20, 22.

FIGS. 4A, 4B, and 5 illustrate the locations of the infrared sensors 18, 20, 22 when the door 12 is in the open position. As shown, the first and second sensing areas 26, 28 provide substantial coverage of the area in which a passenger exiting the vehicle may be located. Referring specifically to FIGS. 3A, 3B, 4A, 4B and 5, it can be seen that the first sensing area 26 of the first sensor 20 extends downwardly within the bus proximate to the door 12 while the second sensing areas 28 of the second sensors 20, 22 extend downwardly from the door panels for 12*a*, 12*b* to cover the area between the open panels 12*a*, 12*b* on the outside of the transit bus. In this manner, a passenger who has already passed through the doorway 12 and is physically located outside the transit bus 13 but has not yet cleared the area between the door panels 12*a*, 12*b* is detected by one or both of the second sensors 20, 22. In this manner, once the driver/operator has actuated a control for the purpose of closing the door 12, the door 12 may only close if neither of the second sensors 20, 22, detects that an object such as a passenger is within the second sensing area 28, thereby confirming that no passenger is either passing through the rear exit doorway 12 or remains outside of the bus within the area between the two open door panels 12*a*, 12*b*.

While the present embodiment includes one first infrared sensor and two second infrared sensors 20, 22, it will be appreciated that the detection system 10 could employ a lesser number of infrared sensors, for example a single infrared sensor or two infrared sensors, or a greater number of infrared sensors, for example four or more infrared sensors. The sensors may also include a combination of passive and active sensors. It will be appreciated that the locations of the first and second infrared sensors 18, 20, 22 may vary in particular applications. For example in some applications there may be two or more infrared sensors located in or on the exit door header 24 or there may be two or more infrared sensors located on each of the door panels 12*a*, 12*b*. It is also within the spirit and scope of the present invention that the sensors 18, 20, 22 are pivotable to move the first and second sensing areas 26, 28 either by driver control, manually adjustable or integrated to move depending on position of the door panels 12*a*, 12*b*.

FIG. 1 illustrates a first embodiment of the passenger detection system 10 which is utilized in a transit vehicle or bus 13 which includes a door controller (not shown) requiring a closed contact to sense a door obstruction. As shown in FIG. 1, the 24-volt AC power and return are supplied along lines 30 and 32 to each of the infrared sensors 18, 20, 22 at contacts 1 and 2, respectively. Similarly, an output signal from the contact 4 of each of the infrared sensors 18, 20, 22 is supplied along line 34 to the bus door interlock controller input. Finally, contact 5 of each of the infrared sensors 18, 20, 22 is connected to the bus interlock door controller common along line 36. In this manner, the infrared sensors 18, 20, 22 are essentially connected in parallel.

Figure 2:
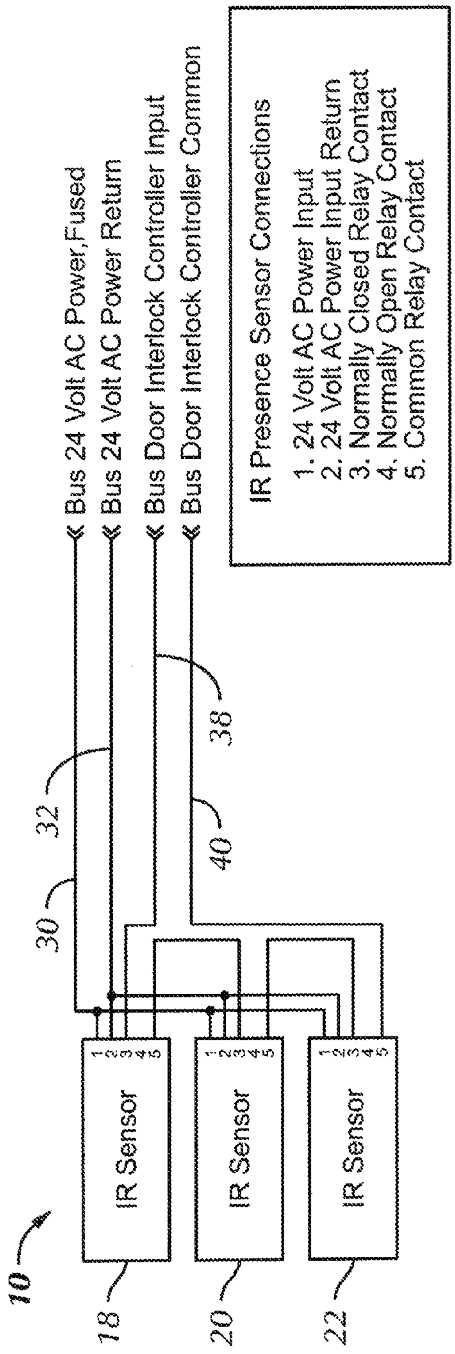
FIG. 2 is a schematic representation of the three infrared sensors of FIG. 1 forming a passenger detection system in accordance with a second preferred embodiment of the present invention.

FIG. 2 illustrates a second embodiment of the interconnection of the three infrared sensors 18, 20, 22 to a bus door controller (not shown) which requires an open contact to sense a door obstruction. As with the embodiment of FIG. 1, the 24-volt AC power and return lines 30, 32 are connected to contacts 1 and 2 of each of the infrared sensors 18, 20, 22. However, unlike the connection shown in FIG. 1, in FIG. 2, the bus door interlock control input is connected along line 38 to contact 3 of infrared sensor 22. Contact 5 of infrared sensor 22 in turn is connected to contact 3 of infrared sensor 18 and contact 5 of infrared sensor 18 is connected to contact 3 of infrared sensor 20. Contact 5 of infrared sensor 20 is connected by line 40 to the bus door interlock controller common. In this manner, the infrared sensors 18, 20, 22 are essentially connected in series.

In operation of the passenger detection system 10, when the bus 13 has completely stopped at a bus stop, the driver or operator actuates a control to enable the opening of the remotely located door 12. If no passenger wishes to exit the bus 13, the door 12 remains in the Closed condition as shown in FIGS. 3A, 3B. If a passenger wishes to exit the bus 13, the passenger must extend his or her hand or the like to preferably enter the first or second sensing area extending downwardly from the infrared sensors 18, 20, 22. Additionally, stepping entirely or partially within the first or second sensing areas 26, 28 is detected by the sensors 18, 20, 22 As soon as the first or second sensing areas 26, 28 extending downwardly from the sensors 18, 20, 22 detects the infrared radiation extending from an object or the triangulated beam is broken, the door 12 is pivoted to the open condition as shown in FIGS. 4A, 4B and 5. Once the door 12 is in the open condition, one or more passengers may exit the bus 13 by passing through the doorway 12 between the open door panels 12*a*, 12*b* and away from the bus 13. After a predetermined period of time has passed or upon the bus driver or operator seeing that no other passengers are exiting the transit bus 13, the driver or operator actuates a control to close the open door panels 12*a*, 12*b*. If all of the exiting passengers have successfully passed through the doorway 12 and beyond the area between the open door panels 12*a*, 12*b*, the door 12 automatically closes permitting the bus 13 to continue along its route. If, on the other hand, a passenger is still passing through the exit doorway 12 or is still located within the first or second sensing areas 26, 28 between the open door panels 12*a*, 12*b* or is otherwise within one of the first and second sensing areas 26, 28 the infrared sensors 18, 20, 22 detect the presence of an object thereby preventing the door panels 12*a*, 12*b* from closing.

The passenger detection system 10 includes an additional alarm feature. If any of the infrared sensors 18, 20, 22 detects the presence of a passenger in the first or second sensing areas 26, 28 after the driver or operator has actuated the control for closing the doors, the doors 12 are not permitted to close. Typically, a passenger exiting a bus 13 will pass through the doorway 12 and beyond the area between the open door panels 12*a*, 12*b* within a second or two. However, sometimes a passenger, possibly a disoriented or disabled passenger could remain in the area between the open door panels 12*a*, 12*b* for more than a few seconds after the control for closing the doors has been actuated. If this is the case, and the infrared sensors 18, 20, 22 sense an object within the first or second sensing areas 26, 28 for more than a predetermined, adjustable time period, typically a few seconds, an alarm is sounded alerting the driver to the fact that the passenger may be lingering either in the doorway 12 or in the area between the two open door panels 12*a*, 12*b* so that the driver or operator may thereby take appropriate action, such as requesting that the passenger move away from the bus 13 and/or door panels 12*a*, 12*b*.

It will be appreciated by those skilled in the art that changes could be made to the embodiments described above without departing from the broad inventive concept thereof. For example, ultrasonic proximity sensors can be used in place of one or more of the infrared sensors. It is understood, therefore, that this invention is not limited to the particular embodiments disclosed, but it is intended to cover modifications within the spirit and scope of the present invention as defined by the appended claims.

We claim:

1. A passenger detection system for a vehicle having at least one opening to allow passengers to enter and exit the vehicle, the passenger detection system comprising:

a door positioned within the at least one opening having a closed position and an open position;

a first infrared sensor located proximate to the door, the first infrared sensor having a first sensing area for detecting whether a passenger is within the first sensing area, the first sensing area being within the vehicle proximate to the door; and a second infrared sensor located proximate to the door, the second infrared sensor having a second sensing area for detecting whether a passenger is within the second sensing area, the second sensing area being within the vehicle proximate to the door when the door is closed and being substantially outside of the vehicle proximate to the door when the door is open.

2. The passenger detection system of claim 1, wherein the first and second sensing areas are adjustable.

3. The passenger detection system of claim 1, wherein the vehicle is a bus having a rear exit doorway.

4. The passenger detection system of claim 3, wherein the first and second infrared sensors are powered from an electrical system of the bus.

5. The passenger detection system of claim 3, wherein the first area is within the bus proximate the rear exit doorway.

6. The passenger detection system of claim 1, wherein the door includes a first and a second panel.

7. The passenger detection system of claim 6, wherein the second area is substantially contained within an area defined between the first and second panels when the door is open.

8. The passenger detection system of claim 1, wherein the first and second sensors are positioned proximate to the top of the door.

9. The passenger detection system of claim 1, wherein detection of the passenger within the first area is used to open the door.

10. The passenger detection system of claim 1, wherein detection of the passenger within the second area when the door is open is used to prevent the door from closing.

11. The passenger detection system of claim 1, wherein the first and second infrared sensors are passive infrared sensors.

12. The passenger detection system of claim 1, wherein the first and second infrared sensors are active infrared sensors.

13. The passenger detection system of claim 1, wherein the second sensor is mounted to the door such that the second sensor is within the vehicle when the door is closed and outside of the vehicle when door is open.

14. A passenger detection system for a vehicle having at least one opening to allow passengers to enter and exit the vehicle, the passenger detection system comprising:

a door positioned within the at least one opening having a closed position and an open position, the door including a first and a second panel, the first and second panels being generally co-planer in the closed position and pivotable outwardly from the vehicle such that the first and second panels are generally parallel in the open position;

a first infrared sensor located proximate to the door, the first infrared sensor having a first sensing area for detecting whether a passenger is within the first sensing area, the first sensing area being within the vehicle proximate to the door; and a second infrared sensor located on the first panel and a third infrared sensor located on the second panel, the second and third infrared sensors having second and third sensing areas respectively for detecting whether a passenger is within the second and third sensing areas, the second and third sensing areas being within the vehicle proximate to the door when the door is closed and being substantially outside of the vehicle proximate to the door when the door is open.

* * * * *